United States Patent
Thomas et al.

(10) Patent No.: US 9,656,375 B2
(45) Date of Patent: May 23, 2017

(54) LINEAR GUIDE RAIL INLAY INSTALLATION TOOL

(71) Applicant: Schaeffler Technologies GmbH & Co. KG, Herzogenaurach (DE)

(72) Inventors: Samuel Thomas, Charlotte, NC (US); Carl White, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 105 days.

(21) Appl. No.: 14/575,510

(22) Filed: Dec. 18, 2014

(65) Prior Publication Data
US 2016/0176030 A1    Jun. 23, 2016

(51) Int. Cl.
| B25B 27/00 | (2006.01) |
| F16C 29/00 | (2006.01) |
| F16C 43/00 | (2006.01) |
| F16C 29/08 | (2006.01) |

(52) U.S. Cl.
CPC ........ *B25B 27/0092* (2013.01); *F16C 29/005* (2013.01); *F16C 29/082* (2013.01); *F16C 43/00* (2013.01)

(58) Field of Classification Search
CPC . B25B 27/00; B25B 27/0021; B25B 27/0028; B25B 33/00; Y10T 29/537
See application file for complete search history.

(56) References Cited

U.S. PATENT DOCUMENTS

| 3,515,444 | A * | 6/1970 | Grabner ............. B23Q 11/0875 277/345 |
| 6,659,439 | B1 * | 12/2003 | Baumgartner ............ B25B 1/12 269/137 |
| 9,107,784 | B2 * | 8/2015 | Doyle ....................... A61G 7/05 |
| 9,334,611 | B2 * | 5/2016 | Barezzani ............... E01B 29/32 |
| 2010/0117281 | A1 * | 5/2010 | Doyle ....................... F16B 2/10 269/97 |

OTHER PUBLICATIONS

"Rolled-in Covering Strip"; INA-Schaeffler KG; pp. 1-8; Germany (Oct. 2003).
"Covering Strip—Fitting Manual"; INA-Schaeffler KG; pp. 1-10; Germany (Oct. 2003).
"Covering Strip ADK for Guideway TSX (RUE), TKVD (KUVE-B)—Fitting and Maintenance Manual"; Schaeffler Technologies GmbH & Co. KG; pp. 1-12; Germany (Apr. 2010).

* cited by examiner

*Primary Examiner* — Lee D Wilson
(74) *Attorney, Agent, or Firm* — Volpe and Koenig, P.C.

(57) ABSTRACT

A simplified installation tool for installing a cover strip in a linear guide rail assembly is provided. The installation tool includes a body having a channel that extends across a bottom surface of the body that is adapted to receive a guide rail. The channel is defined by an upper surface with a lead-in angled projection and sides defined by two L-shaped guide portions that extend from the upper surface and that face each other. Two undercut areas of the channel are located between the L-shaped guide portions and the upper surface of the channel. Retention tabs of the installation tool can attach to the carriage of the linear guide rail assembly. The lead-in angled projection provides a downward force on the cover strip as the carriage travels along the guide rail to press the cover strip into a flattened state within a slot of the guide rail.

15 Claims, 4 Drawing Sheets

LINEAR GUIDE RAIL INLAY INSTALLATION TOOL

FIELD OF INVENTION

The present invention relates a linear guide rail, and is more particularly related to an installation tool for a cover strip of a linear guide rail.

BACKGROUND

Linear guide systems include guide rails and carriages. The guide rails typically include holes for bolts required to mount the guide rail. These known guide rails include slots for cover strips which are used to prevent contaminants from entering the mounting holes. Installing the cover strips requires a special rolling tool and requires a user to manually guide the special rolling tool along the cover strip to secure the cover strip within the slot of the guide rail. These special rolling tools can be expensive and difficult to operate. Additionally, different sized rolling tools are required for different sized rails, increasing costs. It would be desirable to provide a simplified and more cost effective installation tool that does not require a user to manually press the cover strip within the slots of the guide rail.

SUMMARY

An installation tool for installing a cover strip in a linear guide rail assembly is provided. The installation tool includes a body having a channel that extends across a bottom surface thereof that is adapted to receive a guide rail. The channel is defined by an upper surface with a lead-in angled projection and sides defined by two L-shaped guide portions that extend from the upper surface and that face each other, defining two undercut areas located between the L-shaped guide portions and the upper surface of the channel. Retention tabs that can be attached to a carriage of the linear guide rail assembly are located on the body. The lead-in angled projection is adapted to provide a downward force on the cover strip as the carriage travels along the guide rail to press the cover strip into a flattened state within a slot of the guide rail.

Additional embodiments are described below and in the claims.

BRIEF DESCRIPTION OF THE DRAWINGS

The foregoing Summary and the following detailed description will be better understood when read in conjunction with the appended drawings, which illustrates a preferred embodiment of the invention. In the drawings.

DETAILED DESCRIPTION OF THE PREFERRED EMBODIMENTS

Figure 1:
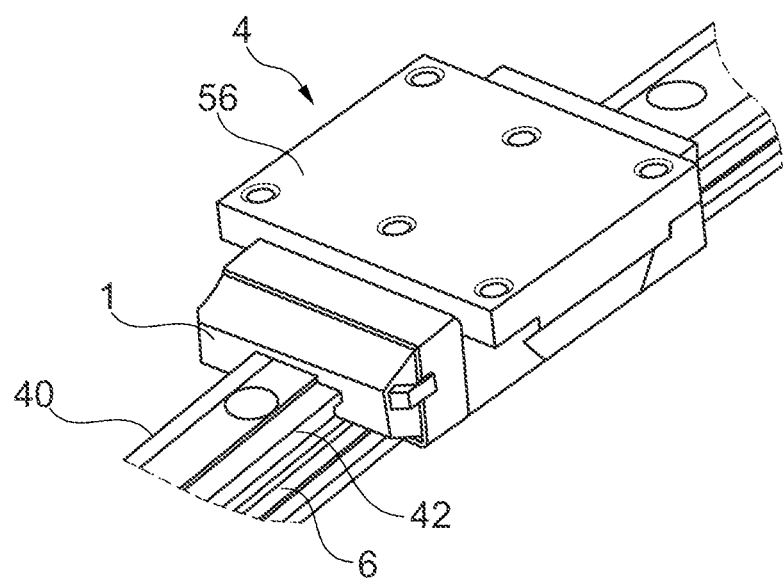
FIG. 1 shows a perspective partial view of a linear guide rail assembly including an installation tool according to an embodiment of the invention.

Certain terminology is used in the following description for convenience only and is not limiting. The words "front," "rear," "upper," and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 2:
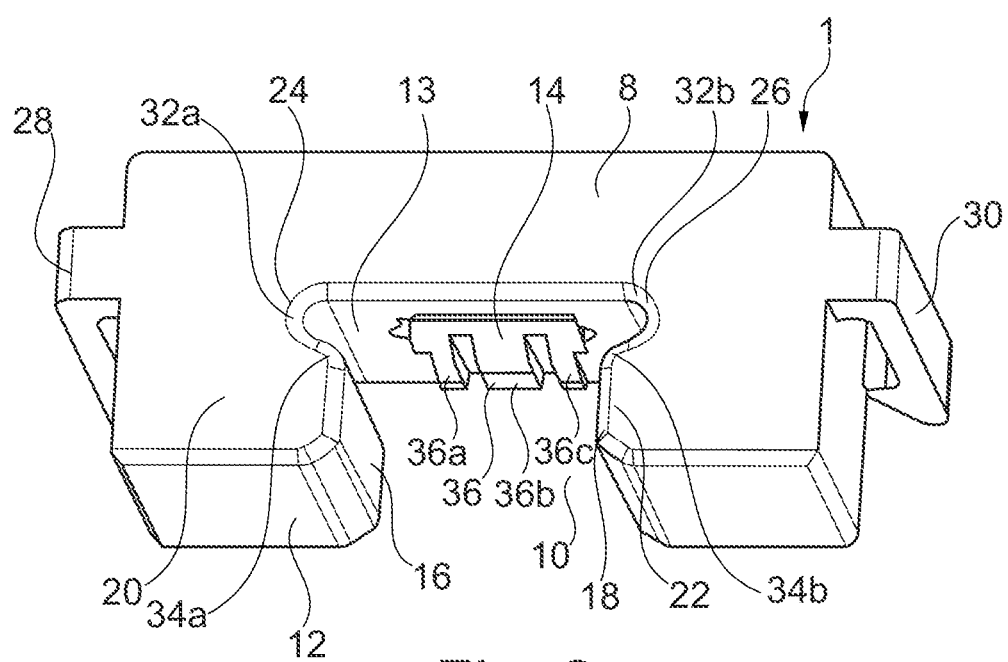
FIG. 2 shows a perspective view of the installation tool according to an embodiment of the invention.

As shown in FIGS. 1 and 2, an installation tool 1 for installing a cover strip 2 (shown in FIG. 3) on a linear guide rail assembly 4 is provided. The installation tool 1 includes a body 8 having a channel 10 that extends across a bottom surface 12 of the body 8 that is adapted to receive a guide rail 6. The channel 10 is defined by an upper surface 13 with a lead-in angled projection 14 and sides 16, 18 defined by two L-shaped guide portions 20, 22 that extend from the upper surface 13 and that face each other. In one embodiment, the lead-in angled projection 14 includes a plurality of ramps 36a-c. As shown in FIG. 2, the lead-in angled projection 14 preferably includes three ramps 36a-36c, with a middle one of the three ramps 36b being wider than end ones of the three ramps 36a, 36c. This configuration of the ramps 36a-36c provides an improved force on the cover strip 2 during installation compared to a single ramp configuration. Two undercut areas 24, 26 of the channel 10 are located between the L-shaped guide portions 20, 22 and the upper surface 13 of the channel 10.

As shown in FIG. 2, each of the two undercut areas 24, 26 are defined in part by a concave portion 32a, 32b and a convex portion 34a, 34b of the body 8. Each of the two undercut areas 24, 26 preferably has a semi-circular shape. One of ordinary skill in the art will recognize that the shape of the two undercut areas 24, 26 can vary depending on the profile guide rail. The undercut areas 24, 26 are dimensioned to accommodate guide projections 40, 42 of the guide rail 6, such that a sliding clearance exists between the guide portions 20, 22 and guide projections 40, 42 arranged on opposite outer surfaces 44, 46 of the guide rail 6. Each of the convex portions 34a, 34b of the body 8 engages a respective one of the two guide projections 40, 42 of the guide rail 6 at a contact point. One of ordinary skill in the art recognizes that the portions 34a, 34b could include a different profile than a convex shape, including a flat surface, to accommodate an alternative profile of a guide rail 6. In one embodiment, the installation tool 1 is plastic. In one preferred embodiment, the installation tool 1 includes a nylon coating on the lead-in angled projection 14.

A carriage 56 that is configured to slide on the guide rail 6 is also shown in FIG. 1. As shown in FIGS. 1 and 2, the installation tool 1 is connected to the carriage 56 via retention tabs 28, 30 arranged on opposite sides of the body 8 that engage the carriage 56. The retention tabs 28, 30 preferably have a snap-fit connection with the carriage 56. The retention tabs 28, 30 are preferably formed from a resilient material and can be elastically deformed to engage the carriage 56. In one embodiment, the installation tool 1 lacks retention tabs and can abut against the carriage 56 when installed on the guide rail 6. To install the cover strip 2, the carriage 56 can be pushed along the guide rail 6 and push the installation tool 1 along the top surface of the cover strip 2. In one embodiment, the installation tool 1 can be manually forced along the guide rail 6 to install the cover strip 2, without the use of the carriage 56.

Figure 3:
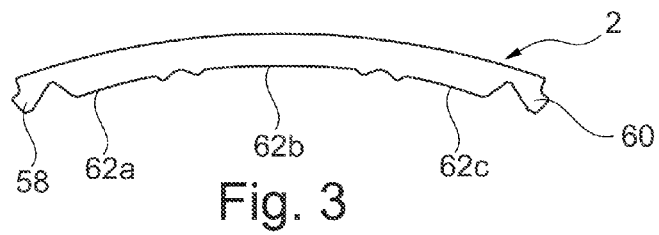
FIG. 3 shows a front view that defines the cross-section of a cover strip for the linear guide assembly according to an embodiment of the invention.
Figure 4A:
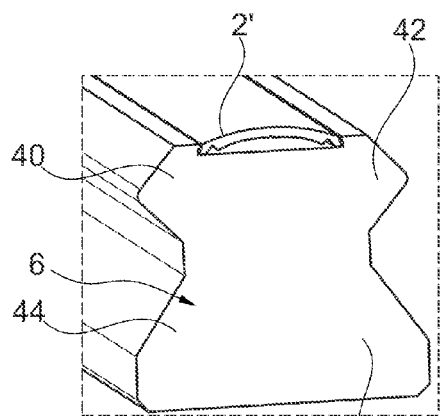
FIGS. 4a and 4b show views of the cover strip in a first, uninstalled state within a slot of a guide rail.
Figure 4B:
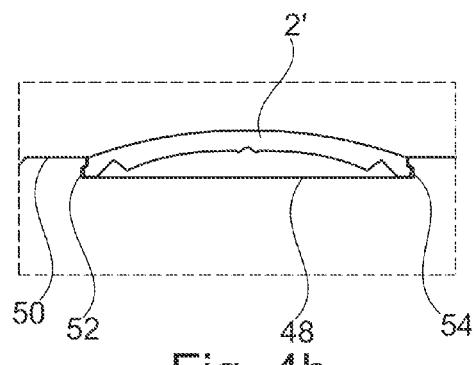

The guide rail 6 also includes a slot 48 on a top surface 50 thereof having two recesses 52, 54 facing each other, and the cover strip 2 is dimensioned to be installed within the slot 48 of the guide rail 6. As shown in FIGS. 3, 4*a*, and 4*b*, the cover strip 2 has a bowed profile in a first, uninstalled state 2'. In one embodiment, the cover strip 2 is a composite, including an outer surface formed from steel and underside formed from aluminum. As shown in FIG. 3, in one embodiment, the cover strip 2 includes compression relief zones 62*a-c*. The cover strip 2 preferably includes three compression relief zones 62*a-c* that correspond to the three ramps 36*a-c* of the lead-in angled projection 14. One of ordinary skill in the art recognizes that the cover strip 2 may not include any compression relief zones.

Figure 5A:
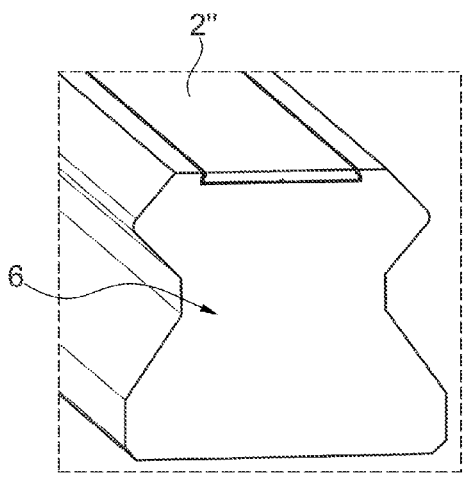
FIGS. 5a and 5b show views of the cover strip in a second, installed state within the slot of the guide rail.
Figure 5B:
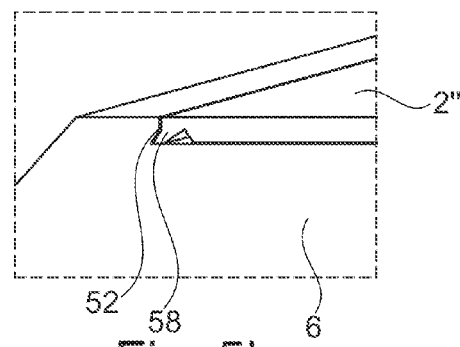

The cover strip 2 is pressed against the slot 48 by the lead-in angled projection 14 as the carriage 56 travels along the cover strip 2. The lead-in angled projection 14 engages the carriage 56 as the carriage 56 slides along the guide rail 6 and forces the cover strip 2 to a second, installed state 2", shown in FIGS. 5*a* and 5*b*, such that the cover strip 2 is flattened and plastically deformed so that it is secured within the slot 48 of the guide rail 6. Once the lead-in angled projection 14 disengages from the cover strip 2, the cover strip 2 springs back slightly to its second, installed state 2". In one embodiment, the cover strip 2 includes retention beads 58, 60 on either end of the cover strip 2 that each engage within one of the two recesses 52, 54 of the slot 48 of the guide rail 6. Once the cover strip 2 is installed, the tool 1 is disengaged from the carriage 56 and can either be saved or disposed of since it is preferably an inexpensive molded plastic part.

Figure 6:
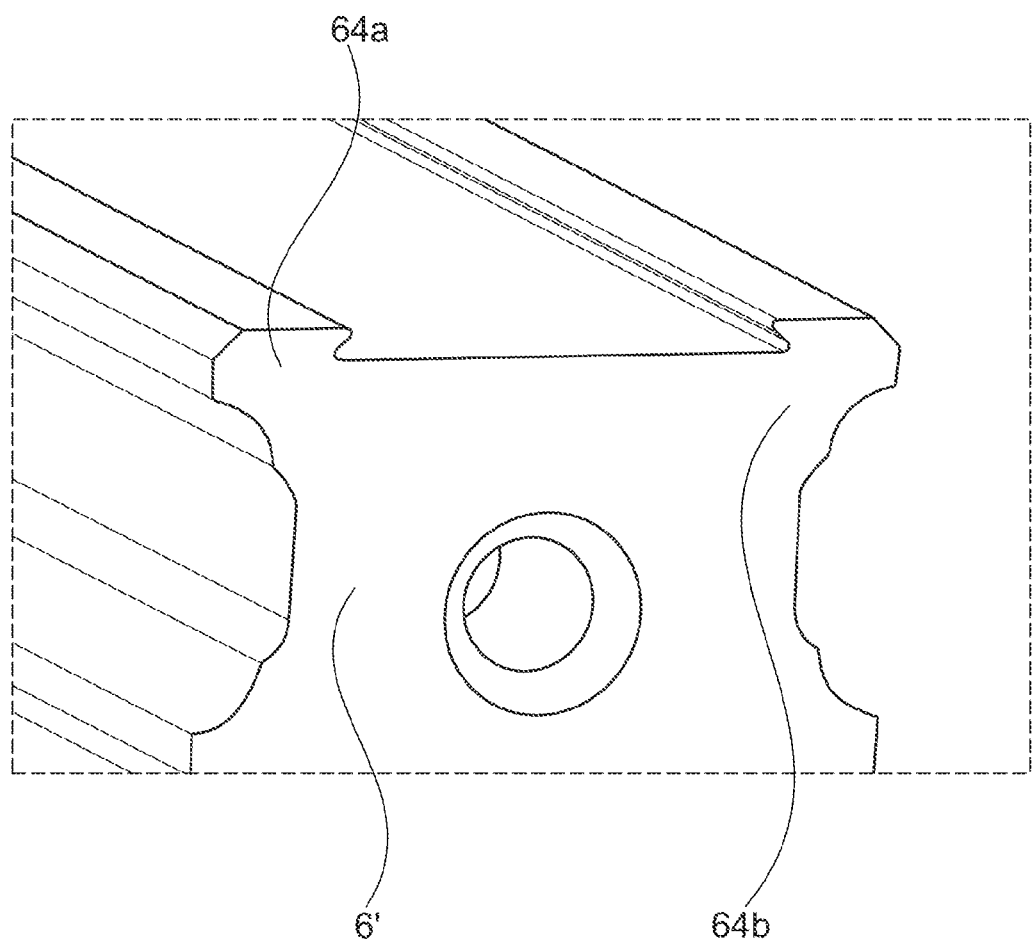
FIG. 6 shows a view of an alternative embodiment of a guide rail according to the invention.

Another embodiment of the guide rail 6' is shown in FIG. 6. In FIG. 6, the guide rail 6' includes two semi-circular overhang portions 64*a*, 64*b* which perform a similar function but are shaped differently than the guide portions 40, 42 of the guide rail 6 shown in FIG. 5*a*. The overhang portions 64*a*, 64*b* provide guidance for the carriage 56 as the carriage 56 slides on the guide rail 6'. One of ordinary skill in the art will recognize that the profile of the guide portions 40, 42 and overhang portions 64*a*, 64*b* can vary depending on the application. The undercut portions 24, 26 of the installation tool 1 can likewise vary to correspond to the profiles of the guide rails 6, 6'.

Figure 7:
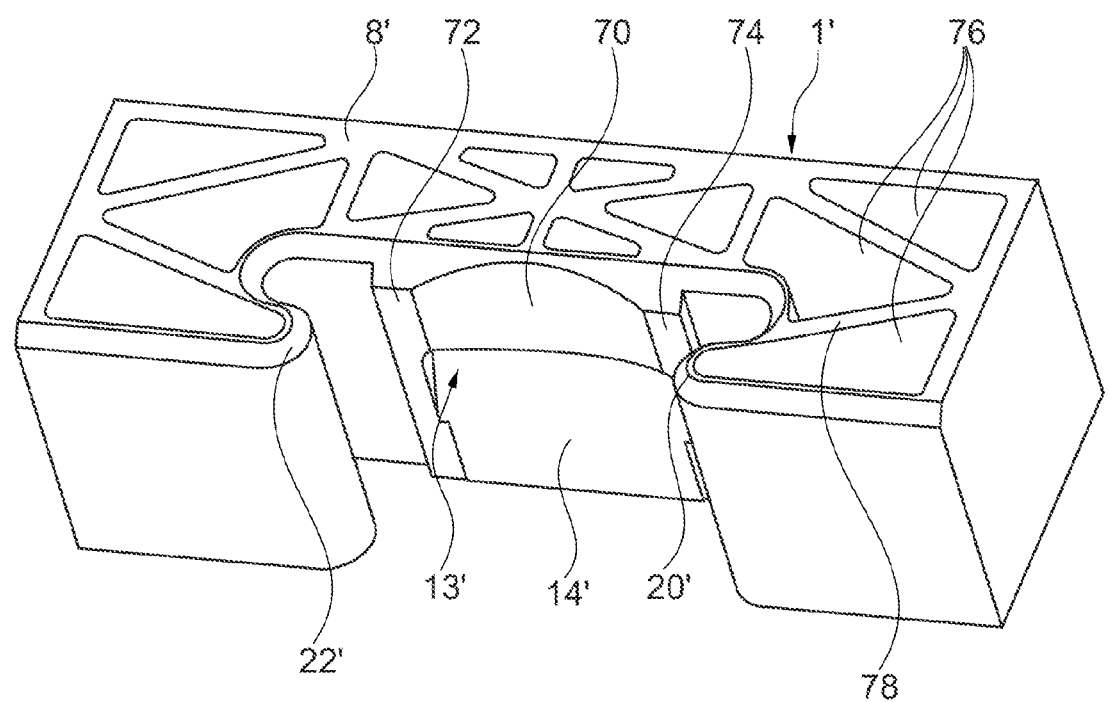
FIG. 7 shows a perspective view of an alternative embodiment of the installation tool according to the invention.

One embodiment of the tool 1' is shown in FIG. 7. In this embodiment, the leading edge of the body 8' includes an upper surface 13' having an angled projection 14', a recessed portion 70, and skid plates 72, 74. The angled projection 14' in this embodiment consists of a single angled portion. The skid plates 72, 74 include flat surfaces that are parallel to a corresponding surface on the guide rail 6. The skid plates 72, 74 provide stability and prevent the installation tool 1' from tilting when riding along the guide rail 6. In this embodiment, the body 8' includes a plurality of openings 76 and webbing 78. This configuration reduces the material required to form the installation tool 1' while maintaining sufficient strength via the webbing 78.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. An installation tool for installing a cover strip on a linear guide rail assembly, the installation tool comprising:
    a body including a channel that extends across a bottom surface of the body that is adapted to receive a guide rail, the channel defined by an upper surface with a lead-in angled projection including at least one ramp extending into the channel and sides defined by two L-shaped guide portions that extend from the upper surface and that face each other, and two undercut areas of the channel are located between the L-shaped guide portions and the upper surface of the channel.

2. An installation tool for installing a cover strip on a linear guide rail assembly, the installation tool comprising:
    a body including a channel that extends across a bottom surface of the body that is adapted to receive a guide rail, the channel defined by an upper surface with a lead-in angled projection and sides defined by two L-shaped guide portions that extend from the upper surface and that face each other, and two undercut areas of the channel are located between the L-shaped guide portions and the upper surface of the channel; and
    at least one of:
    (a) retention tabs arranged on opposite sides of the body, or
    (b) a nylon coating on the lead-in angled projection.

3. The installation tool of claim 1, wherein the installation tool is plastic.

4. The installation tool of claim 1, wherein each of the two undercut areas includes a concave portion and a convex portion.

5. The installation tool of claim 1, wherein each of the two undercut areas has a semi-circular shape.

6. The installation tool of claim 1, wherein the at least one ramp includes a plurality of ramps.

7. The installation tool of claim 1, wherein the at least one ramp includes three ramps, and a middle one of the three ramps is wider than end ones of the three ramps.

8. A linear guide rail assembly comprising:
    a guide rail including two guide projections arranged on opposite outer surfaces of the guide rail, and a slot on a top surface of the guide rail having two recesses facing each other;
    a carriage configured to slide on the guide rail;
    a cover strip dimensioned to be installed within the slot of the guide rail, the cover strip having a bowed profile in a first, uninstalled state; and
    an installation tool configured to be connected to the carriage having a body including a channel that extends across a bottom surface of the body that is adapted to receive the guide rail, the channel defined by an upper surface with a lead-in angled projection and sides defined by two L-shaped guide portions that extend from the upper surface and that face each other, and the channel includes two undercut areas located between the L-shaped guide portions and the upper surface of the channel, wherein the lead-in angled projection engages the cover strip as the carriage slides along the guide rail and forces the cover strip to a second, installed state such that the cover strip is flattened and secured within the slot of the guide rail.

9. The linear guide rail assembly of claim 8, wherein each of the two undercut areas includes a concave portion and a convex portion, and each of the convex portions engages a respective one of the two guide projections of the guide rail.

10. The linear guide rail assembly of claim 8, wherein the cover strip includes retention beads on either end of the cover strip that each engage within one of the two recesses of the slot of the guide rail.

11. The linear guide rail assembly of claim 8, wherein the cover strip includes compression relief zones.

12. The linear guide rail assembly of claim 8, wherein the lead-in angled projection includes three ramps, and the cover strip includes three compression relief zones.

13. The linear guide rail assembly of claim 8, wherein the lead-in angled projection has a nylon surface coating.

14. The linear guide rail assembly of claim 8, wherein the installation tool includes retention tabs arranged on opposite sides of the body that engage the carriage.

15. The linear guide rail assembly of claim 14, wherein the retention tabs have a snap-fit connection with the carriage.

\* \* \* \* \*